Patented Jan. 10, 1950

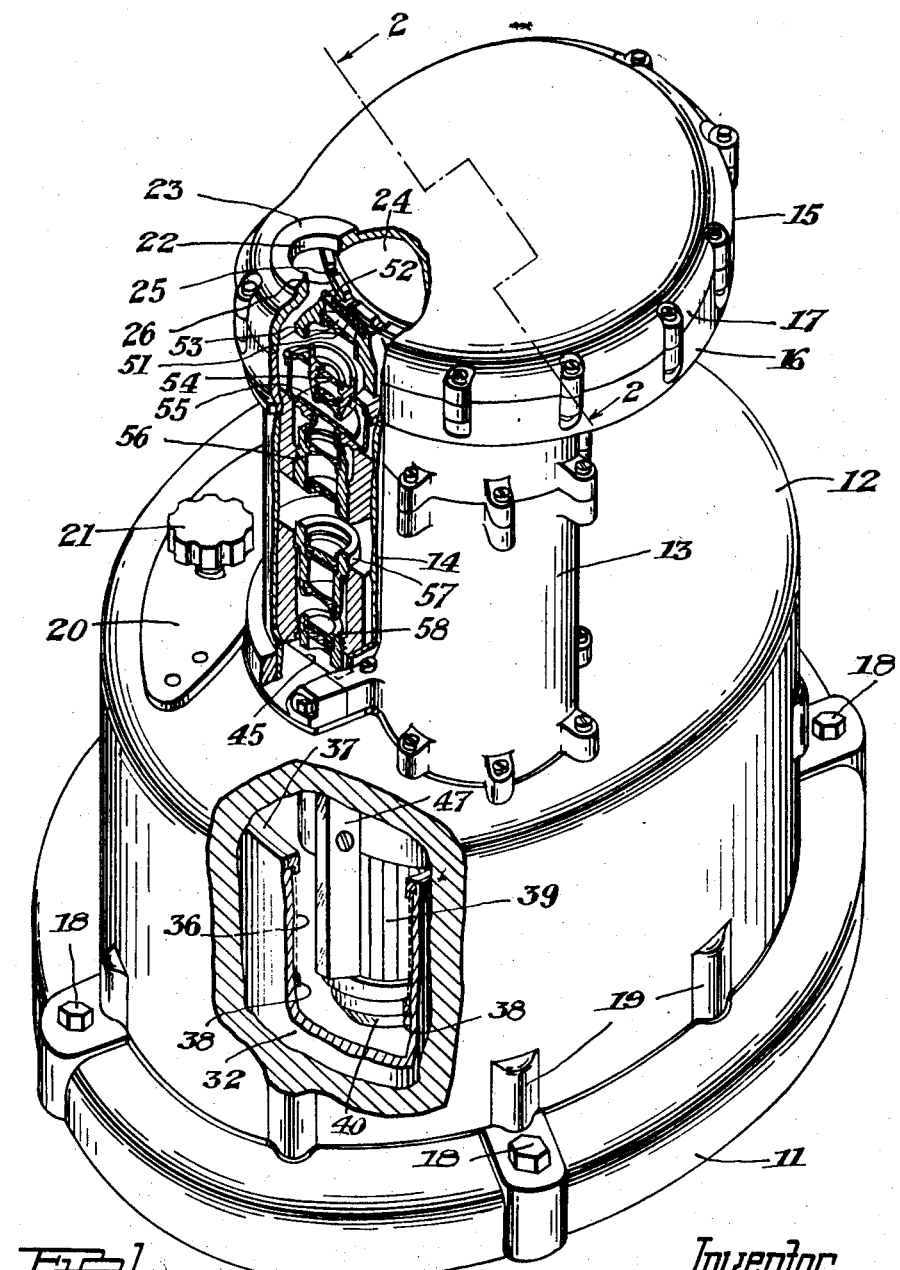

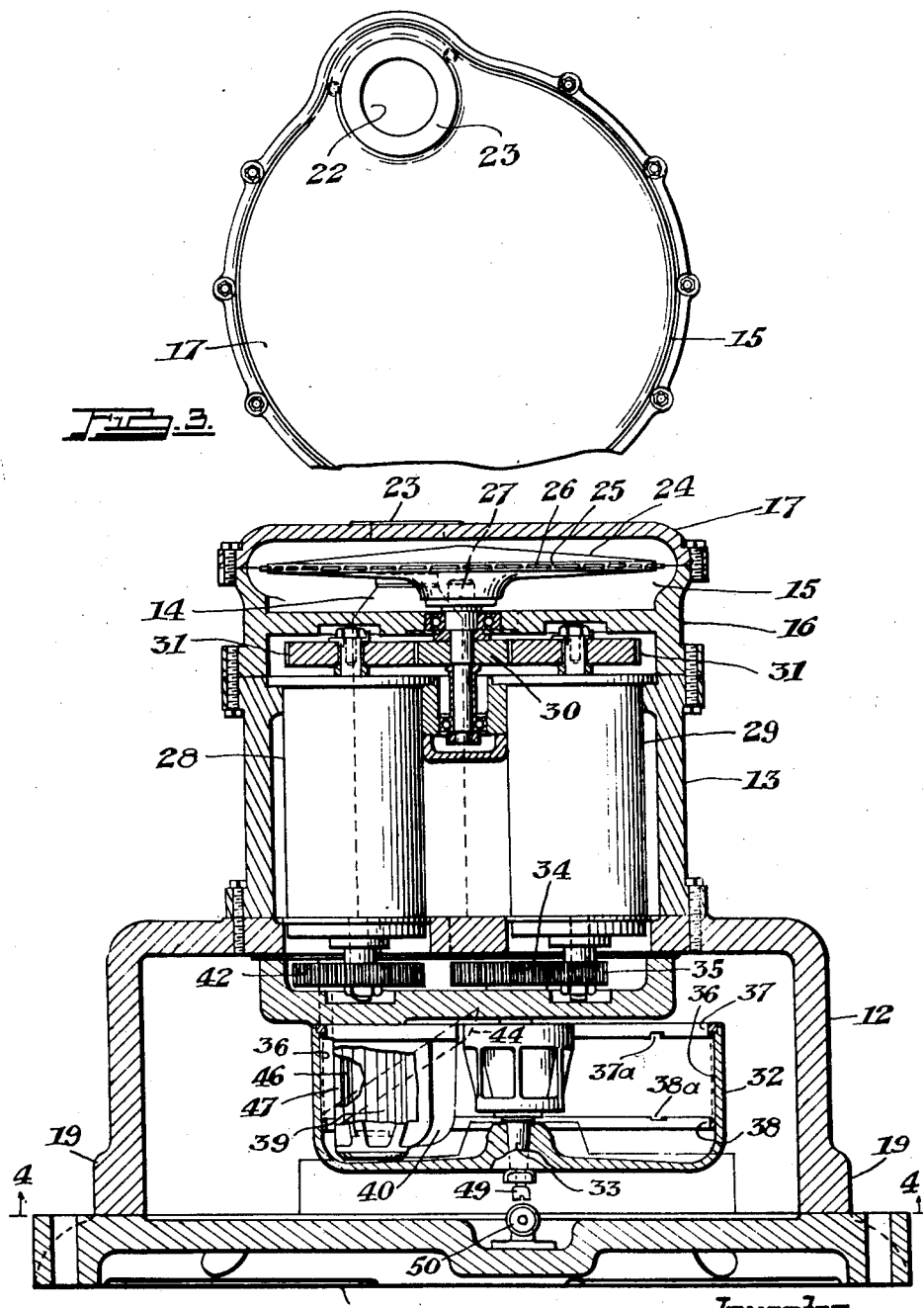

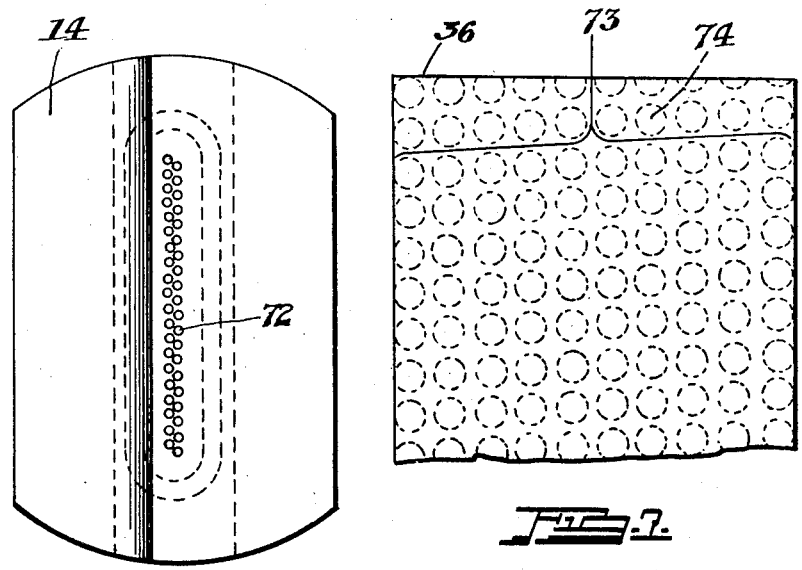
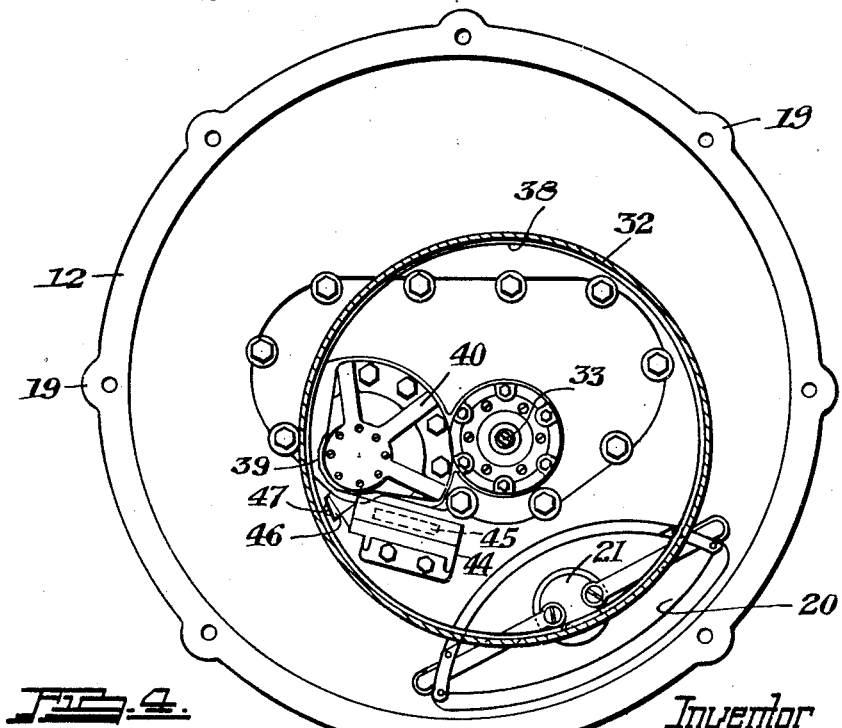

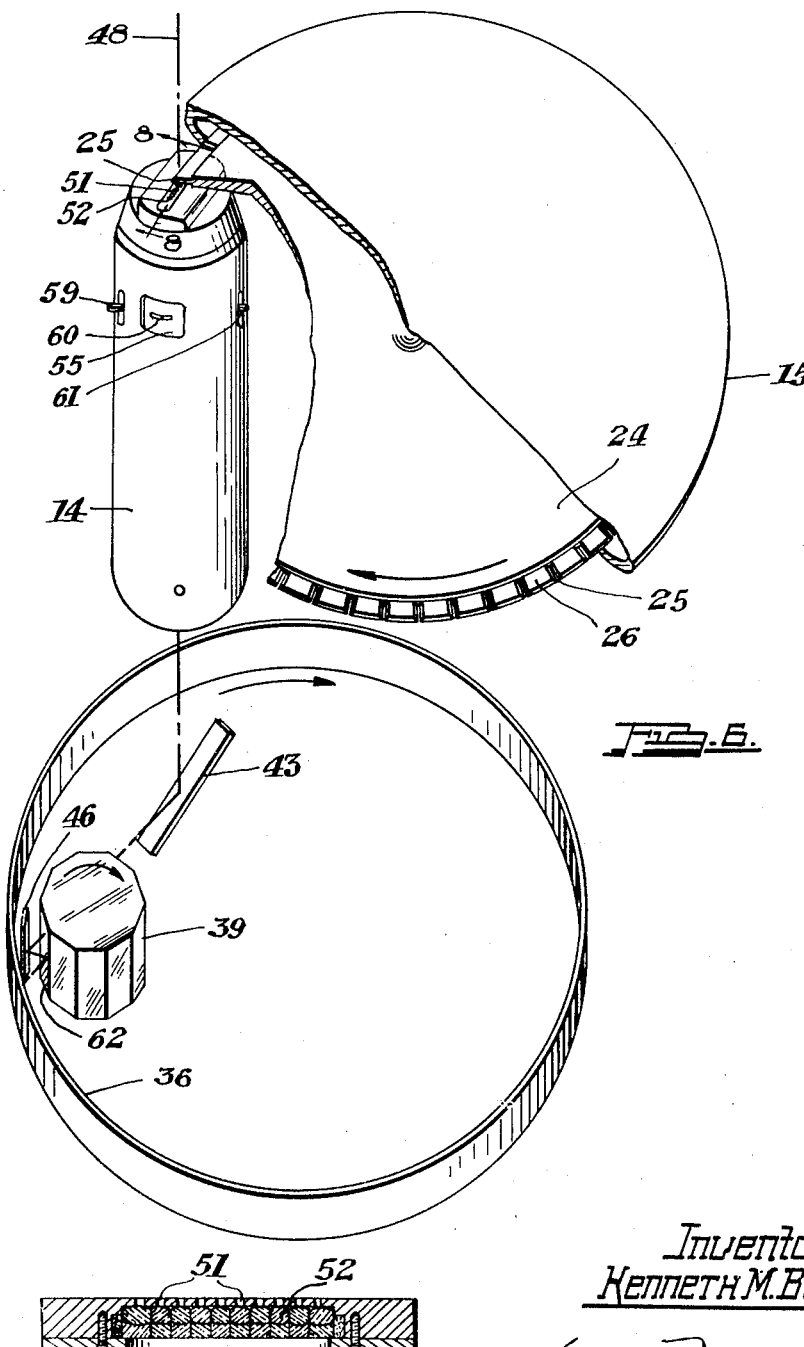

2,494,082

UNITED STATES PATENT OFFICE 2,494,082

HIGH-SPEED CAMERA

Kenneth McClure Baird, Ottawa, Ontario, Canada, assignor to The Honorary Advisory Council for Scientific and Industrial Research, Ottawa, Ontario, Canada, a corporation of Canada Application June 28, 1947, Serial No. 757,741

12 Claims. (Cl. 88—16.8)

This invention relates to high speed cameras, and in particular to high speed cameras using moving film to take a large number of exposures of an event having a duration of only a small fraction of a second.

Known high speed cameras use either a stationary film or a moving film depending on the method of spacing exposures of the film. In the stationary film type, a moving optical system is used to space the exposures, and a separate optical channel is provided for each exposure of an event. Because of the complexity of this optical system, it is not practical to take a large number of exposures of an event, a serious limitation when it is considered that the completeness of the record of the event depends on how many exposures are taken.

Because the intermittent film motion of an ordinary motion picture camera is impractical at high speed due to mechanical limitations of film and of intermittent motion mechanism, high speed moving film type cameras usually move the film continuously by a rotating drum. The length of film can be no more than the circumference of the drum, making it desirable to obtain as many exposures as possible for this length. Such a camera usually has a shutter which remains open for one revolution only of the film drum, and another shutter to provide several exposures in a single row along the film during that revolution. Cameras of this type which have been in practical use can provide only about 100 exposures along the limited length of film, and have the further disadvantage that their exposure rate is limited to about 40,000 exposures per second by mechanical limits on the speed of the film drum.

Prior to the present invention, a proposal has been made to build a high speed moving film camera which would be capable of about 1000 successive exposures at the rate of 120,000 per second. The proposal is to have 1000 optical apertures which may be provided with individual lens systems, arranged in ten adjacent circumferential rows about a rotatable drum with transverse rows at a slight angle to the drum's axis. The film is to be placed against the inner surface of the drum, and the apertures individually exposed by rotating the drum at 7200 R. P. M. within a light tight box having one narrow slit opening parallel to the axis of the drum and close to its circumference. The slit opening is for allowing light through the apertures in succession to produce rows of exposure across the film during rotation of the drum. In this system, ten rows of exposures of the film would occur while it advances at a rate suitable for one row, and so the exposure rate of the camera is made ten times faster than that of previous cameras capable of only a single row of exposures of the film.

However, practical use of this proposal is unlikely, because there are serious disadvantages in its construction and, moreover, its exposure rate is not as high as is desirable when photographing very high speed events. The construction with 1000 apertures, each having an individual lens system arranged in a precise pattern about the circumferential surface of a drum, would be achieved only at great expense. To double the exposure rate with drum speed of 7200 R. P. M. it is necessary to increase the number of apertures to 2000, making such a camera still more impractical. On the other hand, if the exposure rate is to be increased by increasing the drum speed, it is difficult, if not impossible, to design a drum carrying 1000 lens systems which is capable of withstanding the centrifugal strains developed at the increased speed.

According to the present invention there is provided a high speed camera using moving film which is capable of up to at least 1300 successive exposures and of exposure rates up to at least 800,000 exposures per second. A high speed camera according to the invention comprises a drum adapted to hold film in cylindrical form, means for rotating the drum and film at a high speed, means including an array of at least two adjacent apertures adapted to produce transversely of the direction of film rotation an array of exposures of the film, and a shutter operable repeatedly to expose said apertures in succession as the drum is rotated to produce arrays of exposures in consecutive rows spaced in the direction of film rotation.

The shutter, in a camera according to the invention, may be a rotatable opaque disk having a plurality of evenly spaced slots formed in the rim thereof, the distance between adjacent slots being equal to the distance swept circumferentially between the centres of two adjacent apertures by a slot multiplied by the number of apertures. The distance between slots is such that the time interval between exposure of the last aperture of an array by one slot and the exposure of the first aperture of the array by the next slot is equal to the interval between the exposure of successive apertures.

An important feature of a camera according to the invention is that it may include a rotatable, reflecting prism for reflecting light from the apertures to the film, and thereby cause the reflected exposures to move in the same direction as the film to give sharper pictures than could be obtained by the proposal described.

The invention will be more fully described by reference to the attached drawings which illustrate certain embodiments of it, and in which Figure 1 is a perspective, partly in section, of a camera according to the invention;

Figure 2 is a cross section taken on the line 2—2 of Figure 1;

Figure 3 is a top view of the shutter housing in the position shown in Figure 2;

Figure 4 is a cross section taken on the line 4—4 of Figure 2;

Figure 5 is a top view of a lens tube illustrating a variation in the array of apertures;

Figure 6 is a diagrammatic view in perspective of the optical system of the camera;

Figure 7 is a diagrammatic view showing the pattern of exposures taken on a piece of film by the camera; and Figure 8 is an enlarged cross-section taken on the line 8—8 of Figure 6.

In the drawings, the camera is metal cased by a baseplate 11, a base housing 12, a motor housing 13, a lens tube 14, and a shutter housing 15 having lower and upper castings 16 and 17. The base housing 12 is held to the baseplate 11 by bolts (not shown) in the baseplate 11 and threading into bosses 19, and the baseplate 11 is fastened by bolts 18 to a table or similar support for holding the camera in a vertical position. A film loading opening in the top of the base housing 12 is closed by a door 20 with a release knob 21. An opening 22 for light in the shutter housing 15 is directly above the lens tube 14, and has a boss 23 around it to support a mirror or prism if required to direct light into the lens tube 14.

A shutter 24, within the shutter housing 15, is a metal disk having forty slots 25 evenly spaced about its rim 26, and is mounted on a vertical shaft 27. Shaft 27 is arranged to be driven by high speed electric motors 28 and 29 through a shutter gear 30 and motor gears 31. Within the base housing 12, the film drum 32 on shaft 33 is driven by motor 29 through a drum gear 34 and a motor gear 35. Film 36 is held by film retaining rings 37 and 38 against the inner surface of the drum 32, with the sensitive surface of the film facing inward. Notches 37a and 38a in the inner edges of the film rings 37 and 38 are sufficiently wide and deep to accommodate the full width of film 36 when it is being loaded into the film drum 32. A rotatable reflecting prism 39 on a shaft (not shown) is supported by a casting 40 and geared to motor 28 by a prism gear (not shown) and a motor gear 42. Also, within the film drum 32, is a mirror 43 (see Fig. 6) held directly below the lens tube 14 by a mirror support 44 (see Fig. 2), at an angle of 45° to the rectangular opening 45 in the base housing 12. Another mirror 46 is held close to the prism 39 by mirror support 47 and parallel to the reflecting surfaces of the prism 39. The mirrors 43 and 46 cooperate to reflect light from the opening 45 to the reflecting surfaces of the prism 39, which reflect it to the film 36, as shown diagrammatically in Figure 6 by the line 48.

A permanent magnet 49 is mounted on the lower end of the film drum shaft 33 and is rotatable with it. A coil 50 mounted on the baseplate 11 below the magnet 49 is connected to a suitable meter (not shown) to indicate the rotational speed of the film drum.

The lens tube 14 has, at its upper end and just below the rim 26 of the shutter 24, an array of ten adjacent apertures 51, each coaxial with an objective lens 52. The objective lenses 52 are fitted closely together below the array of apertures 51, and have their optical axes parallel to each other, as shown in Figure 8. The diameter of an aperture 51 is equal to the width of a slot 25, and the distance between adjacent slots 25 in the shutter 24 is equal to the distance swept circumferentially between the centres of two apertures by a slot multiplied by the number of apertures. Below the objective lenses 52, is a field lens 53 followed by a lens cell 54 having the first three elements of an Ernostar f/1.8 lens system, a second shutter 55 which controls access to the film of photographic rays passed by the shutter 24, a lens cell 56 having the remaining two elements of the Ernostar lens system, a lens cell 57 having the first three elements of a Pentac f/2.9 lens system, and a lens cell 58 having the remaining two elements. The Ernostar and Pentac lens systems are well known, and are described in the Handbook of Photography by Henney and Dudley, McGraw Hill Book Co., New York, 1939. The shutter 55 is a camera type shutter, such as the Ilex No. 3 shutter, having exposure speeds up to at least the time of one revolution of the film drum 32 when photographing at the maximum exposure rate of the camera. The relation between the rotational speed of the film drum 32 and the exposure rate of the camera is discussed below. Control levers for the shutter 55 are shown in Figure 6, and consist of a time setting lever 59, a recocking lever 60 and a trip lever 61. Surfaces, such as the inner surface of the lens tube 14 and the inner surface of the film drum 32, which are not used to reflect light and which face the path of light through the camera, are flat black in colour to prevent spurious light reflection.

The motors 28 and 29 are 16 H. P., 400 to 500 volt, 300 cycle, 18,000 R. P. M. induction motors, and have as their source of electric current a generator (not shown) which is powered from any available power source. The electrical connections include fuses, switch, and any suitable means of manually controlling motor speed. The motors 28 and 29 are water cooled, and all the gears and shaft bearings in the camera are bathed in circulated oil through connections not shown in the drawings.

In a photographically dark room, the film 36 is prepared and loaded into the camera. The length of film required is equal to the circumference of the film drum 32, and the width is equal to the distance between the bottoms of the notches 37a and 38a. The door 20 is removed from the base housing 12, by the knob 21, and, with the notches 37a and 38a below the door 20, the film 36, with sensitive side toward the centre of the film drum 32, is fed by hand through the notches 37a and 38a and around the film drum 32. The door 20 is then replaced and, with the shutter 55 closed, the camera may be exposed to light.

The time setting lever 59 is set at the length of time during which it is desired to take exposures of the event to be photographed. If the event to be photographed does not take place directly in front of the opening 22, a mirror or prism is arranged on the boss 23 to direct light from the event into the apertures 51. If the event is of a nature that does not produce enough light for film exposure, electric discharge tubes or flash bulbs may be used to give the short, intense flash of light required while the shutter 55 is open.

If the event is of the recurring type and the photographs need not be taken at any particular time, as may be the case when the event is a sound wave, synchronization is required only between the shutter 55 and the light source. However, usually synchronization is also required with the occurrence of the event, for example when photographing a bullet striking a pane of glass, in which case synchronization connections between the pane, the light source and the trip lever 61 are made by any of the well known methods. The motors 28 and 29 are then started, and the manual motor speed controller is used to bring the film drum 32 to a rotational speed, indicated by the meter connected to the coil 50, such that the time of one revolution is that during which exposures of the event are to be taken, and to which the time setting lever 59 has been set. When the maximum number of photographs is required, the time setting lever 59 would be set to slightly more than the time of one revolution of the film drum 12 to allow the exposures, taken while the shutter 55 moves from a closed to an open position and later at the end of the revolution, while the shutter 55 moves from the open to the closed position, to be overlapped on the film 36. With the opening 22 arranged to receive light from the event, the synchronization connections completed, the time setting lever 61 adjusted, and the film 36 rotating at the proper speed, the occurrence of the event causes the event to be illuminated and photographed at a high exposure rate.

As shown in Figure 6, light from the event follows a path 48 through a slot 25 in the shutter 24 into an objective lens 52, through an aperture 51, through the magnifying lenses in the lens tube 14 to a mirror 43, and then by reflection to a mirror 46, to a side 62 of the reflecting prism 39 and to the film 36. The magnification of the lens cells 54, 56, 57 and 58 of the Ernostar and Pentac lens systems in the lens tube 14 makes each exposure of the film much larger than an aperture 51, and improves the lens-film resolving power relations. The rotation of the shutter 24 causes the slots 25 to pass over the complete array of apertures 51 repeatedly exposing the apertures 51 in succession. The shutter 24, the prism 39 and the film 36 rotate in the directions indicated in Figure 6 at speeds which are of such values and ratios to each other that as the shutter 24 repeatedly exposes the apertures 51 in succession, the prism 39 moves the reflected light for each exposure in the same direction as the film 36 and at the same speed, and the arrays 73 (see Figure 7) of exposures 74 of the film 36 are produced in consecutive rows spaced in the direction of film rotation. Arrays 73 of exposures 74 are shown in Figure 7 on a film 36 as taken by the camera.

As an example, in a camera as described which takes 1300 successive exposures at an exposure rate of 200,000 per second, the rotational speed of the film drum is 9000 R. P. M. of the reflecting prism 60,000 R. P. M., and of the disk shutter 30,000 R. P. M. However, the same camera using the same rotational speeds has an exposure rate of 800,000 per second when the array of ten apertures 51 is replaced by an array of 40 apertures 72, as shown in Figure 5, each aperture 72 having one quarter the area of an aperture 51. The apertures 72 are arranged in two rows of twenty, one above the other, with the apertures 72 in one row staggered with those in the other.

While the embodiments of the invention described have a rotatable reflecting prism for eliminating blurring of the exposures of the film due to film motion, the prism is not an essential feature since good photographs can be taken without it. The light leaving the lens tube may directly expose the film, or be reflected to the film by stationary mirrors only. In such cameras, the film movement relative to the light making an exposure is small since the film advances one frame only during ten exposures in a camera having an array of ten apertures.

What I claim is:

1. A high speed camera comprising a drum adapted to hold film in cylindrical form, means for rotating the drum and film at a high speed, means including a stationary array of at least two adjacent apertures adapted to produce transversely of the direction of film rotation an array of exposures of the film, a shutter operable repeatedly to expose said apertures in succession as the drum is rotated to produce arrays of exposures in consecutive rows spaced in the direction of film rotation, a rotatable reflecting prism adapted to reflect light from the apertures to expose the film, and means for rotating the prism in the same direction as the film.

2. A high speed camera as defined in claim 1, in which the array of apertures comprises a single row of apertures.

3. A high speed camera as defined in claim 1, in which the array of apertures comprises two adjacent rows of apertures, the apertures in one row being staggered with those in the other row.

4. A high speed camera as defined in claim 1, in which the shutter comprises a rotatable opaque disk having a plurality of slots formed therein, so that the distance between slots is such that the time interval between exposure of the last aperture of the array of apertures by one slot and the exposure of the first aperture of said array of apertures by the next slot is equal to the interval between the exposure of successive apertures.

5. A high speed camera as defined in claim 4, in which the array of apertures comprises a single row of apertures.

6. A high speed camera as defined in claim 4, in which the array of apertures comprises two adjacent rows of apertures, the apertures in one row being staggered with those in the other row.

7. A high speed camera comprising a drum adapted to hold film in cylindrical form, means for rotating the drum and film at a high speed, means including a stationary array of at least two adjacent apertures adapted to produce transversely of the direction of film rotation an array of exposures of the film, and a shutter comprising a rotatable opaque disk having a plurality of slots formed therein, so that the distance between slots is such that the time interval between exposure of the last aperture of the array of apertures by one slot and the exposure of the first aperture of said array of apertures by the next slot is equal to the interval between the exposure of successive apertures.

8. A high speed camera as defined in claim 7, in which the array of apertures comprises a single row of apertures.

9. A high speed camera as defined in claim 7, in which the array of apertures comprises two adjacent rows of apertures, the apertures in one row being staggered with those in the other row.

10. A high speed camera comprising a drum adapted to hold film in cylindrical form, means for rotating the drum and film at a high speed, means including a stationary array of at least two adjacent apertures adapted to produce transversely of the direction of film rotation an array of exposures of the film, and a shutter comprising a rotatable opaque disk having a plurality of evenly spaced slots formed in the rim thereof, the distance between adjacent slots being equal to the distance swept circumferentially between the centres of two adjacent apertures by a slot multiplied by the number of apertures.

11. A high speed camera as defined in claim 10, in which the array of apertures comprises a single row of apertures.

12. A high speed camera as defined in claim 10, in which the array of apertures comprises two adjacent rows of apertures, the apertures in one row being staggered with those in the other row.

KENNETH McCLURE BAIRD.

REFERENCES CITED

The following references are of record in the file of this patent:

UNITED STATES PATENTS

| Number | Name | Date |
|---|---|---|
| 1,903,204 | Suhara | Mar. 28, 1933 |
| 1,956,736 | Thun | May 1, 1934 |
| 2,259,228 | Rankin | Oct. 14, 1941 |

FOREIGN PATENTS

| Number | Country | Date |
|---|---|---|
| 547,240 | Germany | Mar. 22, 1932 |